United States Patent [19]
Streck et al.

[11] 3,821,328
[45] June 28, 1974

[54] PROCESS FOR THE PRODUCTION OF COPOLYALKENAMERS

[75] Inventors: Roland Streck; Karl-Heinz Nordsiek; Heinrich Weber; Klaus Meyer, all of Marl, Germany

[73] Assignee: Chemische Werke Huls Aktiengesellschaft, Marl, Germany

[22] Filed: June 22, 1972

[21] Appl. No.: 265,170

[30] Foreign Application Priority Data
June 24, 1971 Germany............................ 2131355

[52] U.S. Cl................. 260/884, 252/429 A, 260/5, 260/33.6 A, 260/33.6 PQ, 260/33.8 UA, 260/887
[51] Int. Cl. ............................................ C08f 29/02
[58] Field of Search..... 252/429 A, 429 C; 260/887, 260/94.7 AA, 889, 93.1, 884

[56] References Cited
UNITED STATES PATENTS

| 3,502,747 | 3/1970 | Fischer et al. | 260/894 |
| 3,523,145 | 8/1970 | Manaresi et al. | 260/876 R |
| 3,692,872 | 9/1972 | Calderon et al. | 260/878 B |

Primary Examiner—Murray Tillmann
Assistant Examiner—J. Ziegler
Attorney, Agent, or Firm—Millen, Raptes & White

[57] ABSTRACT

Copolyalkenamers are produced by reacting a rubbery polybutadiene wherein more than 80 percent of the butadiene contact thereof is a 1,4-polymer, with a polyoctenamer or polydodecenamer or mixture thereof, in the presence of a mixed catalyst containing a compound of a metal of Subgroup 5 through 7 and a metal or a compound thereof of Main Group 1 through 4 of the Periodic Table.

21 Claims, No Drawings

PROCESS FOR THE PRODUCTION OF COPOLYALKENAMERS

BACKGROUND OF THE INVENTION

This invention relates to a novel process for the production of copolyalkenamers catalyzed by a mixed catalyst containing a compound of a metal of Subgroup 5 through 7 and a metal of Main Group 1 through 4 of the Periodic Table or a compound thereof.

By employing the above-mentioned mixed catalysts, cyclic olefins having at least one unsubstituted ring double bond can be cyclized by ring opening. See German published application DAS No. 1,299,868 and German unexamined published application DOS No. 1,570,940.

Such mixed catalysts are also capable of effecting the disproportionation of open-chain olefins. See DOS 1,618,466.

DOS No. 1,929,140 discloses the production, employing these mixed catalysts, of copolymers of polyolefinically unsaturated hydrocarbon polymers and cyclic, olefinic unsaturated hydrocarbon compounds or noncyclic, olefinically unsaturated hydrocarbon compounds.

DOS No. 1,954,092 discloses that these mixed catalysts can be utilized to produce graft polymers by reacting cyclopentene with polybutadienes of various microstructures or with butadiene-styrene block polymers.

According to this invention, copolyalkenamers can be produced in a simple manner employing these mixed catalysts.

SUMMARY OF THE INVENTION

One aspect of this invention relates to the production of copolyalkenamers by reacting a rubbery polybutadiene wherein more than 80 percent of the butadiene content thereof is a 1,4-polymer, with a polyoctenamer or polydodecenamer or mixture thereof, in the presence of a mixed catalyst containing a compound of a metal of Subgroup 5 through 7 and a metal or a compound thereof of Main Group 1 through 4 of the Periodic Table.

In another aspect, this invention relates to vulcanizable rubber mixtures comprising the thus-produced copolyalkenamers and to a process for the production thereof.

DETAILED DISCUSSION

Rubbery homo- and/or copolymers of butadiene suitable for use in the process of this invention are those wherein more than 80 percent, preferably more than 90 percent, and most preferably more than 95 percent, of the butadiene of the butadiene homopolymers and of the butadiene proportion of the butadiene copolymers is in the form of a 1,4-polymer, preferably a cis-1,4-polymer. The reason why most of the butadiene content of the above-mentioned rubbery homo- and/or copolymers of butadiene must be in the form of a 1,4-polymer is because the presence of 20 percent or more of 1,2-double bonds leads to undesired cross-linking reactions during the reaction with the polyalkenamer.

The polybutadienes employed in the process of this invention include the conventional butadiene 1,4-homopolymers or copolymers. Examples thereof are cis-1,4-polybutadiene homopolymers, styrene-butadiene copolymers and copolymers of butadiene with other mono- and/or diolefins. For illustrative methods of preparing such polymers, see, e.g., J.L. Binder, Ind. & Eng. Chem., 46, 1927 (Aug. 1954); U.S. Pat. Nos. 3,301,840; 3,418,394 and 3,452,119.

Preferred are polybutadiene homopolymers, especially the 1,4-cis-polybutadienes with an RSV (measured in bencene at 25° C) of 0,5 – 10 dl./g., especially of 1,5 – 5 dl./g. and less than 10 percent, especially less than 5 percent vinyl-groups.

Suitable polyalkenamers for the preparation of the copolyalkenamers are polyoctenamers and polydodecenamers and mixtures thereof having a reduced specific viscosity of 0.2 – 3.0 dl./g., measured at 135° C. in decahydronaphthalene ("Decalin"). The polyoctenamers employed contain more than 75 percent, preferably more than 80 percent trans-double bonds and the polydodecenamers employed contain more than 60 percent, preferably more than 75 percent trans-double bonds.

In the process of this invention, the reactants, i.e., the rubbery polybutadiene as defined herein, and the selected polyalkenamer can be reacted with each other in any desired quantitative ratio. Generally, the polymer mixture of polybutadiene and polyalkenamer consists of 5–98 percent by weight, preferably 10–90 percent by weight, of the polyoctenamer and/or polydodecenamer, based on the weight of the mixture.

The reaction of the polybutadiene and polyalkenamer can be conducted in any solvents which are known to be suitable in polymerizations employing Ziegler/Natta-type catalysts The most important representative compounds from the group of the aliphatic, alicyclic, aromatic and halogenated hydrocarbons are pentane, hexane, heptane, n- and isooctane, isononane (hydrogenated trimer propene), n-decane and isodecane (hydrogenated tetramer of propene), cyclopentane, cyclohexane, methylcyclopentane, methylcyclohexane, ethylcyclohexane, isopropylcyclohexane, cyclooctane and decahydronaphthalene, hydrogenated terpenes, e.g., pinane and camphane, cyclohexene and the substitution products thereof, benzene, toluene, o-, m-, p-xylene, ethylbenzene, o-, m-, p-diethylbenzene, n-propylbenzene, isopropylbenzene, and other mono-, di- and polyalkylbenzenes, tetrahydronaphthalene, methylene chloride, chloroform, carbon tetrachloride, 1,2-dichloroethylene, trichloroethylene, tetrachloroethylene, chlorobenzene, o-dichlorobenzene, trichlorobenzene (mixture of isomers), bromobenzene, fluorobenzene and 1,2-dichloroethane.

It is essential that the solvents are as free as possible of water and other H-acidic compounds, as well as compounds with donor functions (Lewis bases). Such impurities, except for very small amounts which are optionally added to achieve specific effects, generally impair the activity of the catalyst.

Several modes of operation can be employed for the conductance of the process of this invention. Thus, for example, cyclooctene or cyclododecene or a mixture thereof, can be polymerized employing a mixed catalyst containing a compound of a metal of Subgroup 5–7 and a metal or compounds thereof of Main Group 1–4 of the Periodic Table, as well as optionally additional activators. Thereafter, the solution or suspension of the thus-produced polyoctenamer and/or polydodecenamer can be mixed, without inactivating the catalyst, with a solution of the selected rubbery homo- and/or copolymer of butadiene. In this mode of operation, the choice of solvent during the preparation of the product determines whether the polyoctenamer or polydodecenamer is obtained in a solution or as a suspension. The polyoctenamer and polydodecenamer remain in solution in most of the aforementioned solvents, except pentane, hexane and methylene chloride, which generally is more advantageous for the further intermolecular reaction with the polybutadiene.

In another embodiment of the process of this invention, the polyoctenamer or polydodecenamer is produced separately, isolated, analyzed, if desired, and then mixed in predetermined quantities as a solution or suspension again with a mixed catalyst and a solution of the rubbery homo- and/or copolymer of butadiene as defined above.

It is not advantageous to conduct the polymerization of the cyclododecene in the presence of the polybutadiene solution, since the results generally are not favorable. Also, the copolyalkenamers produced according to this type of polymerization possess a different microstructure than the products prepared according to the other two abovedescribed modes of operation, and do not exhibit the desired spectrum of properties.

The process of this invention can be conducted at temperatures of between −50° and +50° C. Advantageously, between −30° and +40° C., and preferably between 0° and +30° C. The upper reaction temperature is limited by the thermal stability of the catalyst and the lower reaction temperature; by the reaction velocity which is reduced too much if too low a temperature is employed.

The production of copolyalkenamers according to the process of this invention is accompanied to a greater or lesser extent by a side reaction which results in the production of low-molecular degradation products of the polybutadiene. This undesired side reaction takes place to an increasing extent with increasing reaction time. Therefore, although this side reaction theoretically can be avoided, without any further measures, by employing a correspondingly short reaction period, it is difficult to realize correspondingly short reaction times experimentally, due to the viscosity of the polymer solutions and the associated agitation and mixing problems.

The undesired degradation of the polybutadiene can also be presented, while maintaining readily achievable reaction times, by conducting the production of the copolyalkenamers in the presence of a vinyl halogenide. Therefore, advantageously, the process of this invention is conducted in the presence of a vinyl halogenide.

This effect of vinyl halogenides is surprising because they considerably promote the activity of the aforementioned mixed catalyst during the polymerization of the cycloolefins.

Since the degradation reaction, which is known per se, can also be considered a disproportionation between double bonds of the same polymer chain, it could not be foreseen that vinyl halogenides would influence two reactions based on the same mechanism in such a manner that the desired reaction is promoted, and the undesired reaction is suppressed.

The vinyl halogenides, preferably vinyl chloride and vinyl bromide, are effective in the process of this invention in small quantities of the order of magnitude of the catalyst components, i.e., 1–1,000 millimols/millimol of the transition metal component of the mixed catalyst. However, they can also be used without disadvantage in great excess, based on the mixed catalyst mentioned above. The point in time at which the vinyl halogenide is added is not critical and can be prior to, during, or after the polymerization of the cyclooctene or cyclododecene. The only essential consideration is that the vinyl halogenide is added before the addition of the solution of the polybutadiene.

Conjugated diolefins, e.g., butadiene, have a very disadvantageous effect on the catalyst employed in the process of this invention. Consequently, any diolefin must be removed to the maximum possible extent, e.g., by vacuum degasification, when a solution of the polybutadiene obtained from the production thereof is directly employed for the preparation of the copolyalkenamers, instead of a solution obtained by dissolving a finished monomer-free, rubbery homo- and/or copolymer of butadiene in the reaction solvent in a separate operation.

The copolyalkenamers obtained according to the process of the present invention, which are characterized by a block structure, can be processed to a vulcanizable mixture directly or as a blend with natural or other synthetic rubbers. Due to their high thermoplasticity, the products are suitable especially for those fields of use where it is desirable to work with an unvulcanized rubber mixture exhibiting thermoplastic properties to a high degree, e.g., having a hardness (defo according to German Industrial Standard DIN 53 514) at 20° C. which is relatively high, but which, at the processing temperature, e.g., above 80° C., is in the normal range or even lower, so that the mixture can be readily shaped, but the article produced therefrom, e.g., a tire or a part thereof, changes shape only slightly or not at all until cured by vulcanization.

This objective can, in principle, be achieved by adding to the rubber mixture a thermoplastic polymer whose melting temperature and/or glass point is between the storage temperature and the processing temperature, e.g., butadiene-styrene copolymers which are rich in styrene. However, a disadvantage of such admixtures is an impairment of the dynamic properties of the vulcanizate, so that such mixtures are unsuitable for the production of articles subjected to strongly fluctuating mechanical stresses, e.g., vehicle tires.

This disadvantage of the state of the art has now been overcome by the use of the copolyalkenamers produced in accordance with the process of this invention. These products impart to the unvulcanized rubber mixtures the desired thermoplasticity without exerting an adverse effect on the dynamic properties of vulcanizates manufactured therefrom.

The resulting copolyalkenamers can be employed as a component in any conventional vulcanizable rubber mixture, which for instance are described in Encyclopedia of Polymer Science and Technology, Vol 5, 450 ff (1966), Interscience Publishers, New York.

The hardness of unvulcanized vulcanizable rubber mixtures can be regulated by the polyoctenamer and/or polydodecenamer content of the copolyalkenamer component thereof. In general, vulcanizable rubber mixtures should contain 2–30 percent by weight, preferably 5–20 percent by weight, of polyoctenamer and/or polydodecenamer units, based on the rubber content thereof.

The incorporation of fillers into the vulcanizable mixtures comprising a copolyalkenamer of this invention, and/or the admixture thereof into conventional rubber mixtures can be accomplished in customary processing units conventional in the rubber industry. In this connection, it is a prerequisite that the temperature of 70° C. is exceeded during this treatment. Normally, the intermixing can be conducted without a special working step simultaneously with the incorporation of the fillers during the preparation of the basic mixture, employing a rolling mill or an internal mixer. In this procedure, it is possible to use any of the various types of fillers and plasticizers. For the preparation of specific vulcanizates it is furthermore possible to employ the conventional adjuvants, such as antiaging and crosslinking agents, without limitation.

The conductance of the cross-linking vulcanization reaction in presses, autoclaves, etc., does not require special techniques.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

All RSV-values given in the examples were measured in "Decalin" at 135° C.

EXAMPLES

Example 1 and Comparative Experiment A

100 Ml. (87 g.) of cyclododecene was diluted in an apparatus (consisting of a three-necked 1,000 ml. flask fitted with a dropping funnel, an agitator, and a protective gas connection) under a pure nitrogen atmosphere, with 150 ml. of technical hexane (b.p. 68°–70° C.), and then mixed at 20° C. with 0.5 millimol of tungsten hexachloride, 0.5 millimol of ethanol and 3 millimols of ethylaluminum dichloride. The solution very rapidly became viscous and was diluted with another 250 ml. of hexane after about 5 minutes to permit continued stirring. After a polymerization period of 10 minutes, 200 ml. of a solution containing 31 g. of 1,4-cis-polybutadiene ("BUNA" CB 10, RSV = 2.7 dl/g, Stereokautschukwerke GmbH, Marl) in perchloroethylene was added thereto and mixed for another 5 minutes with the polymerization charge before the reaction was interrupted by decomposition of the catalyst by the addition of 50 ml. of methanol containing 3 g. of potassium hydroxide and 0.25 g. of 2,6-di-tert.-butyl-p-cresol ("IONOL").

The reaction product was precipitated by pouring the solution into 2 liters of methanol, extracted for 1 hour with 1 liter of methanol in order to remove residual solvent and catalyst and dried in a vacuum drying chamber at 50° C. There was obtained 48.3 g. of a colorless, almost transparent copolymer having a reduced specific viscosity (RSV) as measured in tetrahydronaphthalene ("Decalin") at 135° C. of 0.35 dl./g. and possessing, in accordance with analysis by IR spectroscopy, 59 percent of its double bonds in the trans-1,4-form, 40 percent in the cis-1,4-form, and 1 percent in the 1,2-form, i.e., as vinyl groups. Solubility in toluene at 25° C. was less than 2 percent.

In a similarly conducted parallel experiment (Comparative Example A), the catalyst was inactivated prior to the addition of the polybutadiene solution, so that no linking of the two polymers could occur. In this way, 55.0 g. of a polymer mixture was obtained having an RSV of 1.04 and a double bond distribution of 32 percent trans, 67 percent cis and 1 percent vinyl groups. The product was obtained as opaque, white crumbs, 42 percent by weight of which dissolved in toluene at 25° C. The dissolved portion contained 94 percent cis-, 5 percent trans- and 1 percent vinyldouble bonds. Since the cis-1,4-polybutadiene employed exhibited a double bond distribution of 98 percent cis-, 1 percent trans-, and 1 percent vinyl-double bonds, it is apparent the polybutadiene was extracted from the mixture of polydodecenamer and polybutadiene practically quantitatively with cold toluene. The polydodecenamer was almost insoluble under these conditions, as determined in a further dissolution experiment. From the insolubility of the first reaction product in cold toluene, the conclusion can be drawn that the two polymers are cross-linked to each other and the solubility of the copolymer is influenced by the presence therein of polydodecenamer blocks. On the other hand, the solubility of the cross-linked product in hot "Decalin" establishes that indeed no gelling cross-linking took place which, of course, would also result in insolubility in cold toluene.

Examples 2–5

In a series of experiments, respectively 250 ml. (218 g.) of cyclododecene in 2 liters of perchloroethylene was polymerized, employing as catalyst 2 mmol of tungsten hexachloride, 2 mmol of ethanol and 6 mmol of ethylaluminum dichloride, for ten minutes at 26° C. and the reaction product was then mixed with 800 ml. of a solution of 100 g. of cis-1,4-polybutadiene ("BUNA" CB 10) in perchloroethylene. After varying reaction times, the reaction was terminated in the above-described manner and the polymer worked up and isolated. The following results were thus obtained:

| Example No. | 2 | 3 | 4 | 5 |
|---|---|---|---|---|
| Reaction time (minutes) | 2 | 4 | 6 | 10 |
| Polymer, g. | 131.2 | 133.3 | 151.8 | 152.6 |
| RSV (dl./g.) | 1.87 | 1.78 | 1.24 | 0.97 |
| trans-Double bonds, % | 32 | 34 | 38 | 40 |
| Polydodecenamer units in mol % (NMR analysis) | 52.3 | 52.1 | 62.1 | 62.5 |

These values cannot be directly compared with the first example, since different concentrations and stoichiometric relationships are present as compared to Example 1. However, these data clearly show that the extent of degradation and isomerization is dependent on the reaction time.

Example 6 and Comparative Experiment B

A solution of 31 g. of cis-1,4-polybutadiene in perchloroethylene (total volume 500 ml.) was mixed with 3.6 g. of vinyl chloride at 0° C. This addition corresponds to 10 molar percent, based on the monomer units present in the polybutadiene. The catalyst, consisting of 0.5 mmol of tungsten hexachloride, 0.5 mmol of ethanol and 3 mmol of ethylaluminum dichloride was then added and allowed to become effective in the polymer solution under agitation for 5 minutes. After terminating the reaction and working up the reaction mixture as described above, 31.5 g. of a polybutadiene was obtained having an RSV of 1.65 dl./g. and a double bond distribution identical to that of the starting material, which had an RSV of 2.7 dl./g. Thus, some degradation took place but without isomerization. This degradation was far less extensive than a similar polymerization in which vinyl chloride was omitted from the charge (Comparative Experiment B), in which a relatively low-molecular product was obtained having an RSV of only 0.40 dl./g.

Comparative Experiment C

If, in place of the vinyl chloride employed in Example 6, an unsubstituted olefin, e.g., 1-octene, is employed, degradation products of even lower molecular weight than those without any additive are produced, their molecular weight being lower by 1,500 absolute molecular units. It can, therefore, be seen that vinyl chloride inhibits the degradation of the polybutadiene in a specific manner.

Example 7 and Comparative Experiment D

A solution of 85 ml. (75 g.) of cyclododecene in 250 ml. of hexane was mixed, in the presence of 0.18 ml. (0.3 molar percent) of 1-octene, with a catalyst consisting of 2 mmol of tungsten hexachloride, 2 mmol of ethanol and 6 mmol of ethylaluminum dichloride. The polymerization reaction began immediately and the temperature rose quickly from 20° to 29° C. After a reaction time of 2 and 4 minutes, respectively, 250 ml. portions of hexane had to be added in order to maintain the polydodecenamer suspension in a stirrable condition.

After a polymerization period of 15 minutes, 1,500 ml. of a solution of 150 g. of cis-1,4-polybutadiene ("BUNA" CB 10) in perchloroethylene was added within 4 minutes, and the mixture was stirred for another 20 minutes at 20° C. During this step, the polydodecenamer suspension changed into a viscous solution.

The working up and isolation of the copolymer was conducted in the manner described above. The yield of precipitable polymer was 180.4 g. By concentrating the mixture of solvent and precipitant, 32.1 g. of an oil was obtained boiling at above 150° C. at 10 torr [mm. Hg.].

In this experiment (Comparative Example D), the precipitated polymer obtained was soluble in benzene at 25° C. to an extent of 81 percent and exhibited a reduced specific viscosity at 25° C. in this solvent of only 0.24 dl./g. Consequently, severe degradation had occurred.

In a similar experiment (Example 7) in which 50 mmol of vinyl bromide was added to the mixture prior to the addition of the polybutadiene, 166.7 g. of precipitable polyer was obtained, the benzene-soluble proportion of which had an RSV of 2.10 dl./g., i.e., it was far less degraded. Besides, only 15.0 g. of low-molecular oily degradation products was isolated.

Example 8

11 Parts of a copolyalkenamer produced according to the procedure of Example 7 with a reaction time of 5 minutes, having a proportion of block structures contained therein of cis-1,4-polybutadiene and polydodecenamer (trans-1,4-proportion = 73 percent) of 1 : 9 and with an RSV value of 0.97 dl./g. was added to the vulcanization mixture shown below which is useful, for example, for the manufacture of tire carcasses. A similar mixture lacking the copolyalkenamer was prepared for comparative purposes.

| Recipe | A (Parts) | B (Parts) (Comparison) |
|---|---|---|
| Natural rubber Sheets defo hardness 1200 | 50 | 50 |
| SBR 1707 (with 37.5% oil) | 41.25 | 41.25 |
| cis-1,4-Polybutadiene | 19 | 20 |
| Reaction product of polybutadiene and polydodecenamer in a ratio of 1 : 9 | 11 | — |
| FEF (Fast Extruding Furnace) black | 40 | 40 |
| Light-colored plasticizer oil | 14 | 14 |
| Zinc oxide | 3 | 3 |
| Stearic acid | 2 | 2 |
| Sulfur | 3 | 3 |
| "Vulkacit" CZ (N-cyclohexylbenzothiazole sulfenamide) | 1.3 | 1.3 |

The two vulcanizable mixtures were vulcanized. The properties of the vulcanizates with (A) and without (B) the addition of copolyalkenamer are set forth below.

|  |  | A |  |  |  | B (Comparison) |  |  |
|---|---|---|---|---|---|---|---|---|
| Mixture defo | 20° C. |  | 6000/39 |  |  |  | 2300/50 |  |
|  | 40° C. |  | 5000/35 |  |  |  | 1900/29 |  |
|  | 80° C. |  | 720/34 |  |  |  | 840/30 |  |
| Raw tensile strength (kg./cm²) |  |  | 7.0 |  |  |  | 2.6 |  |
| Raw (Gross) elongation (%) |  |  | 1032 |  |  |  | 1570 |  |
| Vulcanization at 143° C. |  | 15' | 30' | 60' | 120' | 15' | 30' | 60' | 120' |
| Tensile strength (kg/cm²) |  | 165 | 142 | 139 | 125 | 158 | 165 | 145 | 128 |
| Elongation (%) |  | 460 | 346 | 354 | 340 | 536 | 412 | 380 | 380 |
| Modulus 300% |  | 92 | 109 | 108 | 104 | 67 | 99 | 101 | 95 |
| Tear resistance acc. to Pohle [notch impact strength] |  | 20 | 17 | 16 | 10 | 18 | 14 | 14 | 10 |
| Hardness ° Shore | 20° C. | 58 | 62 | 61 | 59 | 54 | 58 | 58 | 56 |
|  | 75° C. | 51 | 55 | 55 | 55 | 51 | 56 | 56 | 55 |
| Elasticity | 20° C. | 52 | 56 | 58 | 56 | 58 | 59 | 58 | 58 |
|  | 75° C. | 62 | 64 | 65 | 65 | 63 | 66 | 66 | 65 |
| Compression set |  |  | 12 |  |  |  | 15 |  |  |
| Goodrich Flexometer $\Delta^r$ |  |  | +14 |  |  |  | +13 |  |  |

Example 9

To a mixture B as described in Example 8, except with the cis-1,4-polybutadiene proportion reduced to 10 parts, was added 20 parts of a copolyalkenamer produced according to Example 7 in 15 minutes, having an RSV-value 1.3 dl./g. and a cis-1,4-polybutadiene/polydodecene proportion of 1:1. The total proportion of polydodecenamer units, incorporated in block form, in the resulting mixture (Mixture C) thus amounted to 10 parts, as in Recipe A (Example 8). The properties of the vulcanizate thereof is set forth below. (For comparison, see Mixture B, Example 8.)

|  |  | C |  |  |  |
|---|---|---|---|---|---|
| Mixture defo | 20° C. | 5000/37 |  |  |  |
|  | 40° C. | 4200/36 |  |  |  |
|  | 80° C. | 860/31 |  |  |  |
| Raw tensile strength (kg/cm$^2$) |  | 5.3 |  |  |  |
| Raw [Gross] elongation (%) |  | 1150 |  |  |  |
| Vulcanization at 143° C. |  | 15′ | 30′ | 60′ | 120′ |
| Tensile strength (kg/cm$^2$) |  | 145 | 135 | 128 | 111 |
| Elongation (%) |  | 462 | 388 | 396 | 390 |
| Modulus 300% |  | 85 | 91 | 88 | 81 |
| Tear resistance acc. to Pohle |  | 15 | 14 | 14 | 13 |
| Hardness ° Shore | 20° C. | 60 | 61 | 61 | 59 |
|  | 75° C. | 54 | 54 | 54 | 53 |
| Elasticity | 20° C. | 59 | 59 | 59 | 57 |
|  | 75° C. | 62 | 64 | 63 | 62 |
| Compression set |  | 15 |  |  |  |
| Goodrich Flexometer Δ$^T$ |  | +14 |  |  |  |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of copolyalkenamers which comprises reacting a rubbery polybutadiene wherein more than 80 percent of the butadiene content thereof is a 1,4-polymer, with a polyoctenamer or polydodecenamer or mixture thereof, in the presence of a vinyl halogenide and a mixed catalyst containing a compound of a metal of Subgroup 5 through 7 and a metal or a compound thereof of Main Group 1 through 4 of the Periodic Table.

2. A process according to claim 1 wherein the polybutadiene is a butadiene homopolymer.

3. A process according to claim 2 wherein the polybutadiene is more than 90 percent 1,4-polybutadiene.

4. A process according to claim 3 wherein the polybutadiene is more than 95 percent cis-1,4-polybutadiene.

5. A process according to claim 1 wherein 5–98 percent by weight of the starting mixture of polymers is polyoctenamer or polydodecenamer or both.

6. A process according to claim 5 wherein 10–90 percent by weight of the starting polymer mixture is polyoctenamer or polydodecenamer or both.

7. A process according to claim 1 wherein the polybutadiene is reacted with a polyoctenamer more than 75 percent of whose double bonds are trans-double bonds.

8. A process according to claim 7 wherein more than 80 percent of the double bonds of the polyoctenamer are trans-double bonds.

9. A process according to claim 1 wherein the polybutadiene is reacted with a polydodecenamer more than 60 percent of whose double bonds are trans-double bonds.

10. A process according to claim 9 wherein more than 75 percent of the double bonds of the polydodecenamer are trans-double bonds.

11. A process according to claim 1 wherein a polyoctenamer or polydodecenamer or mixture thereof is employed which has a reduced specific viscosity of 0.1 – 3.0 dl./g., measured in tetrahydronaphthalene at 135° C.

12. A process according to claim 11 wherein the reduced specific viscosity, measured in tetrahydronaphthalene at 135° C., is 0.5 – 2.0 dl./g.

13. A process according to claim 1 wherein the reaction catalyst is a mixture of tungsten hexachloride and ethyl aluminum dichloride.

14. A process according to claim 13 wherein the reaction is conducted at a temperature of between −30° and +40° C.

15. A process according to claim 14 wherein the reaction is conducted at a temperature of between 0° and +30° C.

16. A process according to claim 1 wherein the vinyl halogenide is vinyl chloride.

17. A process according to claim 1 wherein the vinyl halogenide is vinyl bromide.

18. A process according to claim 1 wherein the vinyl halogenide is mixed with the polyoctenamer or polydodecenamer or mixture thereof prior to the addition of the rubbery polymer of butadiene.

19. A process according to claim 1 wherein the reaction is conducted in the presence of 1 to 1,000 times the molar amount, calculated on the transition metal component of the mixed catalyst, of the vinyl halogenide.

20. A process according to claim 19 wherein the reaction catalyst is a mixture of tungsten hexachloride and ethyl aluminum dichloride.

21. A process according to claim 1 wherein a solution or dispersion of a polyoctenamer having more than 80 percent trans-double bonds or of a polydodecenamer having more than 75 percent trans-double bonds, and having a reduced specific viscosity of 0,5 – 2,0 dl/g., measured in decahydronaphthalene at 135° C, is mixed with a solution of a polybutadiene which is more than 95 percent cis-1,4-polybutadiene and 1–1,000 times the molar amount, calculated on the transition metal component of the mixed catalyst, of vinyl chloride or vinyl bromide.

* * * * *

UNITED STATES PATENT OFFICE
CERTIFICATE OF CORRECTION

Patent No. 3,821,328　　　　　　　Dated June 28, 1974

Inventor(s) Roland Streck, et al.

It is certified that error appears in the above-identified patent and that said Letters Patent are hereby corrected as shown below:

IN THE CLAIMS:

CLAIM 11, COLUMN 10, LINE 3 OF THE CLAIM:

"0.1" should read -- 0.2 --.

Signed and sealed this 29th day of October 1974.

(SEAL)
Attest:

McCOY M. GIBSON JR.　　　　　　　C. MARSHALL DANN
Attesting Officer　　　　　　　　Commissioner of Patents